United States Patent

Smith et al.

[15] 3,654,993

[45] Apr. 11, 1972

[54] METHOD FOR INHIBITING CORROSION IN A WELL

[72] Inventors: Frank W. Smith, Plano; Patrick N. Parker, Allen, both of Tex.

[73] Assignee: Atlantic Richfield Company, New York, N.Y.

[22] Filed: Apr. 6, 1970

[21] Appl. No.: 26,144

[52] U.S. Cl..........................166/279, 166/300, 252/8.55 E
[51] Int. Cl....................C02b 5/06, C23f 11/10, C23f 11/14
[58] Field of Search..........166/310, 279; 252/8.55 B, 8.55 E, 252/8.5 C, 180; 210/58

[56] References Cited

UNITED STATES PATENTS

| | | | |
|---|---|---|---|
| 2,783,200 | 2/1957 | Crum et al. | 252/180 UX |
| 3,288,217 | 11/1966 | Ralston | 252/8.55 B X |
| 3,305,019 | 2/1967 | Katzer | 166/310 X |
| 3,400,078 | 9/1968 | Jones | 252/8.55 B X |
| 3,483,925 | 12/1969 | Slyker | 166/310 X |
| 3,549,548 | 12/1970 | Newman | 252/8.55 B X |

*Primary Examiner*—Stephen J. Novosad
*Attorney*—Blucher S. Tharp and Roderick W. MacDonald

[57] ABSTRACT

A corrosion inhibiting composition containing, inter alia, (1) a corrosion inhibitor, (2) at least one material selected from the group of polyacrylic acid, salts thereof, hydrolyzed polyacrylamide, salts thereof, and certain organophosphorus compounds, and (3) at least one acid including and/or in addition to polyacrylic acid if present. A method for treating a well wherein the composition is injected into a subterranean geologic formation and the pH of the composition is raised to cause the formation of a precipitate in situ in the formation.

17 Claims, No Drawings

METHOD FOR INHIBITING CORROSION IN A WELL

BACKGROUND OF THE INVENTION

Heretofore corrosion inhibitors have been injected into a geologic subterranean formation but have been found to be generally readily washed out of the formation by produced fluids, be the fluids hydrocarbonaceous or water based or mixtures thereof.

Ordinarily, only low concentrations of corrosion inhibitor are needed in the produced fluids for corrosion protection and therefore the large amounts of corrosion inhibitor washed out by the produced fluid constitute a substantial economic loss and also substantially shorten the life of the corrosion inhibitor treatment.

SUMMARY OF THE INVENTION

It has now been found that corrosion inhibitors, when combined with certain materials at a low (acid) pH, form a liquid solution which contains no precipitate, which can be readily pumped into a well and injected into a subterranean formation from the well. Further, when the pH of this solution is raised in situ, i.e. as dispersed in the formation, a precipitate forms containing the corrosion inhibitor. It has further been found that the precipitate tenaciously holds to the formation and is sparingly soluble in the hydrocarbonaceous and/or water based liquids produced through the formation into the well bore.

Thus, in addition to a corrosion inhibiting composition, this invention also relates to a method of treating a well wherein the corrosion inhibiting composition is injected into a subterranean geologic formation while in the non-precipitate form and the pH of the composition after injection in the formation is raised to a level where the precipitate forms in the formation.

Since the precipitate is formed in situ in the formation, it is greatly dispersed throughout the formation and, therefore, more effectively imparts to the fluids produced through that formation a corrosion inhibiting capacity.

Since the precipitate tenaciously holds to the formation and is only sparingly soluble in most hydrocarbonaceous and/or water base liquids, larger than needed amounts of corrosion inhibitor are not initially washed out of the formation as was experienced prior to this invention.

Thus, by the practice of this invention, a corrosion inhibition treatment for a well utilizes less corrosion inhibitor with a consequent economic saving and in addition lengthens the time of effectiveness of the corrosion inhibitor treatment thereby achieving an additional economic saving.

Further, the precipitate formed can have, in addition to corrosion inhibiting properties, scale inhibiting properties so that a two-fold treatment is achieved with a single precipitate and a single well treatment.

In addition, other materials can be incorporated into the composition of this invention and therefore injected into a formation and deposited in that formation in accordance with the method of this invention to thereby achieve yet additional treatment effects from the single precipitate and single well treatment. For example, bactericides, fungicides, antioxidants, and the like can also be incorporated in the composition and method of this invention so that a single well treatment following the practice of this invention can effectively and long lastingly treat a well not only for corrosion inhibition and scale inhibition, but a plurality of other protective devices at the same time.

Further, in the practice of this invention, the precipitate formed in situ can be tailored to be more hydrocarbon soluble than water soluble or vice versa by carefully selecting the corrosion inhibitor and other inhibitors to be used and the additional material to be used so that all materials chosen have a preferential solubility for hydrocarbonaceous liquids or water base liquids. Of course, the materials can also be chosen so that a mixture of materials having either hydrocarbon preferential solubility and water preferential solubility are used, thereby bringing the precipitate into a state where it is not preferentially soluble in either type of liquid.

Accordingly, this invention not only effects a substantial economic saving in terms of the amounts of materials used as well as the length of effectiveness of each treatment, but also is exceedingly flexible in the types of materials useful and therefore the number of different inhibition treatments achieved with a single treatment in accordance with this invention.

Accordingly, it is an object of this invention to provide a new and improved corrosion inhibiting composition. It is another object to provide a new and improved composition which can be affected in situ in a subterranean geologic formation to form a tenacious precipitate in that formation. It is another object to provide a new and improved composition which has, in addition to corrosion inhibiting characteristics, scale inhibiting and other inhibiting characteristics. It is another object to provide a new and improved composition which can be tailored to be preferentially hydrocarbon soluble, preferentially water soluble, or neither after deposition in a subterranean geologic formation. It is another object to provide a new and improved composition which can be deposited in situ in a subterranean geologic formation and which will remain in that formation while being only sparingly soluble in liquids produced through that formation. It is another object to provide a new and improved method for treating a well wherein the desired treatment material is precipitated in situ in a subterranean geologic formation of that well. It is another object to provide a new and improved method for treating a well for corrosion inhibition, scale inhibition, and other desired inhibitions using a single well treatment. It is another object to provide a new and improved method for depositing a sparingly soluble material in the formation to thereby minimize the amount of that material taken up by liquids produced through the formation.

Other aspects, objects, and advantages of this invention will be apparent to those skilled in the art from this disclosure and the appended claims.

DETAILED DESCRIPTION OF THE INVENTION

According to this invention there is provided a corrosion inhibiting composition which contains at least one corrosion inhibitor, at least one additional material for forming the desired precipitate in situ, and at least one acid.

The corrosion inhibiting material can be any one of a large number of exceedingly complex materials which are well known as corrosion inhibitors. The corrosion inhibitor should be cationic and contain at least one of nitrogen, oxygen, or elements of Groups VA and VIA (nitrogen, phosphorus, arsenic, antimony, bismuth, oxygen, sulfur, selenium, tellurium, and polonium) of the periodic chart (Handbook of Chemistry and Physics, Chemical Rubber Company, 45th Edition, 1964, p. B-2). The corrosion inhibitor can contain at least one of mercaptans, ureas, thioureas, amines (primary, secondary, or tertiary monoamines, diamines), amides, the amines or amides being polyethoxylated if desired, heterocyclic nitrogen compounds such as imidazolines, rosin derivatives, and the like. The inhibitor is normally a mixture of a plurality of complex compounds so that the precise active inhibiting compound or compounds is unknown. Normally the compounds have from about six to about 50 carbon atoms per molecule. Examplary compounds include $RNH_2$, $R_2NH$, $RN(CH_3)_2$, $RNHCH_2CH_2C H_2NH_2$, $RCONH_2$,

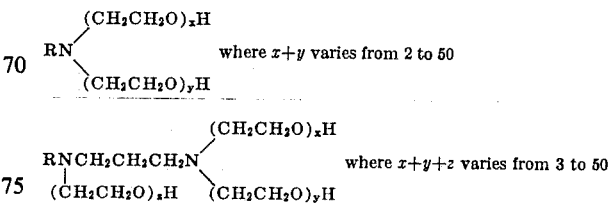

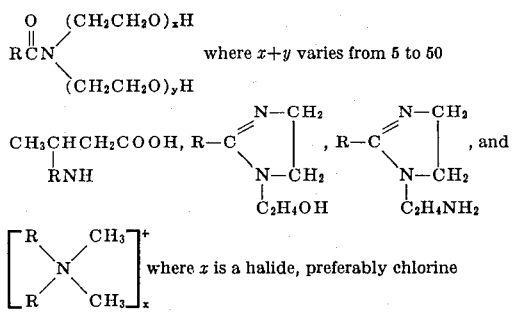

$M_3PO_4$, $M_4P_2O_7$, and $M_5P_3O_{10}$ where M is a metal as defined hereinafter for polyacrylic acid salts. In the above formulae R is preferably an acyclic hydrocarbon having six to 30 carbon atoms per molecule.

Because most corrosion inhibitors are of an exceedingly complex chemical nature and/or are proprietary compounds whose chemical composition is kept secret, and because of the very large number of corrosion inhibitors applicable, it is substantially impossible to further delineate the corrosion inhibitor class applicable to this invention. However, any corrosion inhibitors which can be made to precipitate with the materials hereinafter disclosed in the manner hereinafter disclosed, are applicable to this invention.

The corrosion inhibitor will normally be employed in an effective corrosion inhibiting amount and this amount can vary widely depending upon the materials present, the liquids to be produced through the formation, the nature of the geologic formation, and the like. Generally, the corrosion inhibitor will comprise from about 1 to about 99, preferably from about 4 to about 20, weight percent of the composition. All percentages set forth herein, unless otherwise stated, are weight percentages and are based upon the total weight of the composition of this invention.

The at least one material to be employed in conjunction with the corrosion inhibitor to form the desired precipitate in situ in the formation is selected from the group of polyacrylic acids having a molecular weight of from about 4,000 to about 10,000,000; metal salts of polyacrylic acid wherein the metal is at least one of alkali metals, alkaline earth metals, zinc, copper, lead, iron, chromium, and aluminum, the zinc, copper, and lead preferably having a valence of +2 and the iron, chromium, and aluminum preferably having a valence of +3; hydrolyzed polyacrylamide having a molecular weight of from about 1,000 to about 10,000,000 and from about 10 to about 50 percent unhydrolyzed amide groups; metal salts of the hydrolyzed polyacrylamide wherein the metal is at least one of the metals set forth hereinabove for the polyacrylic acid metal salts; and compounds of the formula

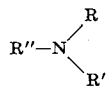

where R is

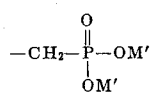

R' is R or —CH$_2$CH$_2$OH, and R" is R, —CH$_2$CH$_2$OH, or

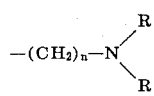

M' is H, NH$_4$, alkali metal, alkaline earth metal, or combinations thereof, and $n$ is 1, 2, or 3.

The molecular weight referred to for the polyacrylic acid and unhydrolyzed polyacrylamide apply also to the metal salts of those materials and are determined by gel permeation chromatography comparison of the esterified polymer.

The polyacrylic acid, unhydrolyzed polyacrylamide, and the metal salts thereof are commercially available materials which are known in the art and procedures for the preparation of which are known in the art.

The low molecular weight hydrolyzed polyacrylamide component of the present invention can properly be termed a polycarboxyethylene-polycarbamylethylene long chain carbon-to-carbon polymer. It is a polyelectrolyte. In the acid form the polymer has the probable formula:

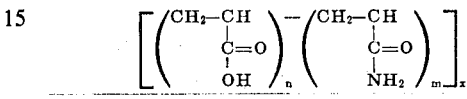

where $n$ and $m$ are whole numbers, such that $n$ is at least about as large as $m$, and not more than about nine times as large as $m$, and $n$ and $m$ and $x$ have such size that the total molecular weight is between 1,000 and 10,000,000, preferably between 4,000 and 10,000,000, and the two groups may occur in random order and orientation. The polyacrylamide has from about 10 percent to 50 percent unhydrolyzed amide groups, and preferably from about 20 percent to about 40 percent.

Conveniently for in situ formation of the precipitate, the polyacrylic acid or the hydrolyzed polyacrylamide or the salts thereof is added as an alkaline metal salt, usually the sodium salt. Potassium, ammonium, or other similarly soluble salts can be used, and all of the acidic hydrogens need not be replaced, nor of those replaced need the cation be the same. Since these materials can be used in dilute solution and the cation, be it alkali metal or hydrogen, etc., is dissociated to an extent that varies with the concentration of other cations present, the material at the time of action can be considered in a transient state, and for purposes of convenience, the name of the acid form can be used for identification without the intention that the material be in such acid form.

The hydrolyzed polyacrylamide in one specific embodiment is a dry light cream-colored solid having a molecular weight of 6,000, a polymer content of 75 percent, with the polymer being 75 percent carboxyl and 25 percent amide, and the diluents, if any, being primarily sodium and ammonium sulfates and sodium hydroxide. The pH of a 1 percent aqueous solution is 10.8 and of a 10 percent solution is 12.1. The solubility is over 25 percent in solutions having a useful viscosity.

The polyacrylic acid, and other materials disclosed above, can normally be present in an amount sufficient to form a precipitate with the corrosion inhibitor or inhibitors present when the pH is above a value in the range of from about 3 to 5. When the material is one of a hydrolyzed polyacrylamide metal salt or polyacrylic acid, the corrosion inhibitor and polyacrylamide salt or polyacrylic acid can be mixed with one another without forming a precipitate at a pH of less than 3 to 5, and the precipitate can be formed by raising the pH of the mixture to or above 3 to 5. These materials can generally be employed in amounts of from about 0.01 to about 60, preferably from about 0.4 to about 2, weight percent.

The acid component of the composition can generally be any acidic material which is substantially non-deleterious to the other reactants and the precipitate to be formed and which is sufficiently strong to reduce the pH of the composition to a point where the precipitate to be formed does not form.

The acid can be polyacrylic acid. Therefore, in the situation where the material which is to react with the corrosion inhibitor to form the precipitate is polyacrylic acid, sufficient polyacrylic acid can be employed to serve as the reactant with the corrosion inhibitor and also to serve as the pH reducing acid. Therefore, in this situation the composition of this invention will be a two component composition, i.e. corrosion inhibitor and polyacrylic acid to react with the corrosion inhibitor to form the precipitate and to lower the pH.

In other situations, an additional acidic material will be added to the composition primarily to reduce the pH thereof, and in these situations the composition will be a three component system, i.e. corrosion inhibitor, material to react with the corrosion inhibitor to form a precipitate, and an acid different from the material to form the precipitate.

Substantially any acid which will meet the above requirements can be employed. Generally, suitable, but non-limiting, acids are hydrochloric, sulfuric, nitric, sulfamic, citric, acetic, chloroacetic, peracetic, and polyacrylic.

Depending on the particular material employed, the pH at which the precipitate is not formed can be below 3 or can be in the 3 to 5 range. It is desirable that the pH be less than 5 so that the precipitate can be formed by an adjustment in the pH to a point somewhere in the 3 to 5 pH range. Generally, the amount of acid employed will therefore vary widely but can be from about 0.1 to about 25, preferably from about 2 to about 5, weight percent.

The composition as described above can be employed by itself or in combination with a carrier liquid which is substantially inert to the composition and precipitate to be formed. The carrier liquid can be any liquid or combination of liquids which is inert to the degree defined above. Suitable, non-limiting examples of such carriers include fresh water; salt water; brine; sea water; glycol having from 2 to 10, inclusive, carbon atoms per molecule; alcohol having from 1 to 10, inclusive, carbon atoms per molecule; acetone; oil; oil fractions such as Diesel oil, kerosene, fuel oil, and the like. Mixtures of two or more of these materials can be employed if desired.

The carrier is normally employed in an effective supporting amount which can vary widely and is normally 1 weight percent up to over 1,000 percent excess.

In addition to the above defined materials, there can additionally be present in the composition at least one material which has a capability of inhibiting at least one undesired result other than corrosion. Thus, this at least one additional material will have a capability of inhibiting oxidation, fungus growth, bacteria growth, and the like. The additional material or materials used will be used in amounts effective to carry out their own inhibiting mechanism and the material or materials used should be substantially inert to the reactants of the composition already present and the precipitate to be formed.

The composition is prepared by simple mixing of the ingredients, taking care that the corrosion inhibitor and material to form the precipitate with the corrosion inhibitor are not mixed with one another in the absence of sufficient acid to lower the pH to a level where precipitate will not form. Thus, it is desirable to add one of the forming components to the other only after one of the components has been mixed with sufficient acid. Accordingly, as a nonlimiting example, the corrosion inhibitor can first be mixed with acid and this resulting acid mixture then mixed with the material to form the precipitate with the corrosion inhibitor. In this manner the precipitate is not formed until emplaced in the formation and the pH raised. Mixing the materials can be carried out under ambient conditions of temperature and pressure, the desired result being simply an intimate mixture of the material and not the conduction of a chemical reaction which would require temperature or pressure variation consideration. Thus, the mixing to form the composition of this invention can be carried out under substantially any conditions so long as the low pH requirement is met. Accordingly, conventional mixing apparatus can be employed in the normal manner.

The thus formed composition is then used in a method for treating the well. By the method, the composition is injected into the well bore and from there into the subterranean geologic formation desired to be treated, the pH raised, and the precipitate formed. Oil, water, and other liquids produced from and through that formation into the well bore for pumping to the surface of the earth thereby contact the precipitate and are treated for corrosion inhibition, and if appropriate materials have been incorporated into the composition, scale inhibition, and the like, as the liquid passes through the formation and before the liquid comes in contact with any of the metallic apparatus present in the well bore and on the earth's surface. In this manner the liquid is rendered substantially innocuous to any metallic apparatus with which it may come in contact after leaving the formation.

Thus, the composition is employed in the well treating method in an effective inhibiting amount. This will vary widely depending upon the condition of the formation, the composition of the formation, the apparatus in the well and at the surface of the earth, and the inhibiting characteristics built into the composition. Thus, if the composition is only a corrosion inhibiting composition it will employ an effective corrosion inhibiting amount. On the other hand, if the composition has a plurality of functions to carry out such as corrosion inhibition, scale inhibition, anti-oxidation, and the like, the amount employed will be that which is effective for achieving each of these desired inhibition results. Normally, at least about 0.01 gallons of the composition will be employed per well treatment and normally from about 0.01 to about 500 gallons will be used in each well treatment.

After the composition has been injected into the formation such as by pressuring the composition into the pores of the formation, the pH of the composition in the formation is raised to a level where the precipitate is formed in situ. The pH can be raised by simply allowing the composition to remain in the formation in its acid state for a sufficient period of time for the acid in the composition to adsorb on the formation, undergo ion exchange with the formation and/or dissolve sufficient of the basic minerals in the formation to raise the pH to a point where the precipitate will form. This technique of allowing natural conditions in the formation to raise the pH to form the precipitate is particularly useful in formations which contain sufficient amounts of basic materials such as calcium carbonate, dolomite, calcium sulfate, and the like.

However, if these natural processes are insufficient to allow formation of the precipitate within a reasonable time, basic materials such as liquid, e.g. aqueous solutions of calcium hydroxide, barium hydroxide, strontium hydroxide, carbonates, hydroxides, and acetates of the alkali metals, and ammonium ion, and the like can be injected into the formation to speed the raising of the pH of the composition present in the formation. This speeds the formation of the desired precipitate in the formation.

Of course, combinations of the techniques of adding an external material to the formation which is basic relative to the pH of the composition and allowing natural conditions in the formation to raise the pH of the composition can be employed.

Suitable basic materials which can be present in the formation for allowing natural conditions to raise the pH include the hydroxides, carbonates, bicarbonates, sulfates, phosphates, and oxides of the alkali metals, alkaline earth metals, ammonia, zinc, copper, lead, iron, chromium, and aluminum.

Since the corrosion inhibitor and polyacrylic acid, etc. material can be mixed together in any sequence so long as the pH requirements are met for preventing the formation of the precipitate, the composition, besides being employable in the well treating method as a total mixture made at the earth's surface, can be injected in parts, i.e. sequentially. Here again the sequential introduction of corrosion inhibitor and polyacrylic acid, etc. material must be carried out so that these materials are not contacted with one another at a pH sufficient to cause the formation of the precipitate before both of these materials are adequately dispersed in the formation. Thus, at least one of the materials, e.g. the corrosion inhibitor, should be injected into the formation with sufficient acid so that the precipitate will not form as soon as the corrosion inhibitor meets with polyacrylic acid, etc. material.

After the composition of this invention is injected into the formation and the precipitate formed in the formation, liquids can be produced through the formation into the well bore for substantial periods of time, e.g. a period of several years or more, and, the liquids thus produced, because of the sparing solubility of the precipitate and the tenacious manner in which the precipitate clings to the formation, will be effectively treated prior to its entering the well bore and contacting any of the apparatus associated with the well. In this manner very long term well treatments are achieved using less treating material than was thought to be necessary heretofore.

EXAMPLE I

A composition was formed composed of 87.7 weight percent water, 3.1 weight percent concentrated hydrochloric acid, 8.2 weight percent of a commercial corrosion inhibitor composed of 25 weight percent of a mixture of imidazolines, amides, and ethoxylated nonylphenol surfactant, the remainder being 27 weight percent isopropanol, and 48 weight percent water, the corrosion inhibitor having a specific gravity of 0.94, a density in pounds/gallon of 7.83, a flash point of 80° F., and a pour point of −30° F., and a viscosity at 80° F. of 39 centipoise, and 1 weight percent of a sodium salt of hydrolyzed polyacrylamide having from about 20 to about 40 percent unhydrolyzed amide groups and having a molecular weight range of from 4,000 to 17,000.

The composition was prepared by mixing the acid in water first, then adding to the acid-water mixture the sodium salt of hydrolyzed polyacrylamide. To this mixture was then added the corrosion inhibitor.

The pH of the resulting composition was less than 4 and the composition was a clear liquid with no visible precipitate therein.

Thereafter, sufficient sodium hydroxide was added to the composition to raise the pH of the composition to about 5. After the pH was thus raised, a corrosion inhibitor-hydrolyzed polyacrylamide complex precipitate was formed. The precipitate was gummy and sticky and of an exceedingly complex nature. The precipitate was found to be only slightly soluble in water and in oil. The corrosion inhibitor of this example was dispersed by itself in a first sandstone plug. The same corrosion inhibitor in a composition according to this invention and similar to the first paragraph of this example was dispersed in a similar, second sandstone plug. A refined hydrocarbon oil was flushed through each plug and the amount of corrosion inhibitor in the effluent oil of each plug measured. The effluent oil from the second plug contained substantially less corrosion inhibitor. For example, after 0.4 pore volumes of oil had been recovered from each plug, the effluent oil from the first plug contained about 18,500 ppm corrosion inhibitor while the effluent oil from the second plug contained 200 ppm corrosion inhibitor.

The composition in the clear liquid form, i.e. pH less than 4, could readily be pumped down a well bore and pressured or otherwise squeezed into the pores of a subterranean geologic formation. The gummy precipitate formed after the pH of the composition was raised to about 5 readily clings to rock formation. Thus, it would be sparingly dissolved from the formation into liquids produced therethrough.

EXAMPLE II

When the corrosion inhibitor of Example I was deleted and imidazole per se substituted therefore, no precipitate was formed when the process of Example I was repeated. Similar results were achieved when 1,6-hexane diamine per se was employed in lieu of the corrosion inhibitor of Example I.

Thus, the corrosion inhibitor employed should have a low solubility in water in order to form the desired precipitate according to this invention.

EXAMPLE III

Two wells near Kiefer, Okla. were treated with the corrosion inhibitor of Example I.

In the control well the corrosion inhibitor alone was employed while in the second well a composition of this invention substantially was employed.

In the control well five 55-gallon (U.S.) drums of the corrosion inhibitor was mixed with 60 barrels (U.S.) of water and displaced 1,500 feet down the well into the producing formation of the well with 100 barrels (U.S.) of water at 1,000 psig (1.5 barrel per minute).

In the second well three 55-gallon drums of the hydrolyzed polyacrylamide of Example I were mixed with 100 gallons of 15 percent hydrochloric acid. The resulting mixture was mixed with five 55 gallon drums of the corrosion inhibitor. The final mixture was displaced 1,500 feet down the well into the same producing formation of the well with 100 barrels of water at 1,000 psig (1.5 barrel per minute). The precipitate was allowed to form naturally by dissolving formation minerals to raise the pH of the injected composition.

Both wells were producing nearly all water at the rate of 500 barrels per day for each well.

The corrosion rates of the water produced through the treated formations of each well was measured every 2 days with conventional electrical probes and was about 2.5 mils/year for each well before treatment.

After treatment the corrosion rates of both wells were reduced. However, after the first day after treatment, the corrosion rate of the control well increased while the corrosion rate of the second (invention) well continued to decrease.

The corrosion rate for the second well continued to decrease to substantially 0 mils per year after 4 days and the substantially zero corrosion rate was maintained for 24 days after which measurements were no longer taken.

The corrosion rate for the control well increased to 20 mils per year after 4 days and thereafter leveled off at about 9 mils per year after 7 days.

The above data indicate that most of the corrosion inhibitor was washed out of the control well during the first day after treatment whereas only a very slight, but yet effective, amount of inhibitor was removed from the second well during the first and subsequent 24 days after treatment. Thus, both more effective and more long term corrosion inhibition was effected by the composition and method of this invention on the second well.

Reasonable variations and modifications are possible within the scope of this disclosure without departing from the spirit and scope of this invention.

What is claimed is:

1. In a method for treating a well, the improvement comprising injecting into the well bore and into a subterranean geologic formation an effective inhibiting amount of the composition consisting essentially of:

a. at least one cationic corrosion inhibitor which contains at least one of nitrogen, oxygen, and elements of Groups VA and VIA, said corrosion inhibitor being present in an effective corrosion inhibiting amount, b. at least one material selected from the group of polyacrylic acid having a molecular weight of from about 4,000 to about 10,000,000; metal salts of said polyacrylic acid wherein said metal is at least one of alkali metals, alkaline earth metals, $NH_4$, Zn, Cu, Pb, Fe, Cr, and Al; hydrolized polyacrylamide having a molecular weight of from about 1,000 to about 10,000,000 and from about 10 to about 50 percent unhydrolyzed amide groups; metal salts of said hydrolyzed polyacrylamide wherein said metal is at least one of alkali metals, alkaline earth metals, $NH_4$, Zn, Cu, Pb, Fe, Cr, and Al; and compounds of the formula

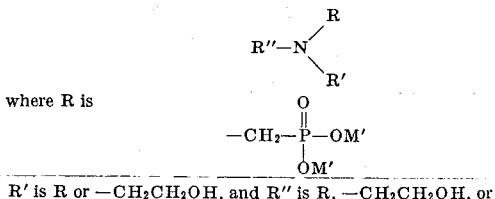

where R is

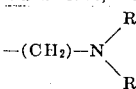

$R'$ is R or $-CH_2CH_2OH$, and $R''$ is R, $-CH_2CH_2OH$, or $$-(CH_2)-N\begin{matrix}R\\R\end{matrix}$$

M' is H, $NH_4$, alkali metal, alkaline earth metal, or combinations thereof, and $n$ is 1, 2, or 3; said material being present in an amount sufficient to form a precipitate with said corrosion inhibitor when in a pH range of from about 3 to about 5, and c. at least one acid in an amount sufficient to lower the pH to a level where said precipitate will not form, and raising the pH of the composition in the formation to a level where a precipitate is formed in situ by components (a) and (b).

2. A method according to claim 1 wherein said pH is raised by adding material to said well and formation which is basic relative to the pH of said composition.

3. A method according to claim 2 wherein said basic material of group (a) is at least one of the hydroxide, carbonate, bicarbonate, sulfate, phosphate, and oxide of the alkali metals, alkaline earth metals, $NH_4$, Zn, Cu, Pb, Fe, Cr, and Al.

4. A method according to claim 2 wherein component (b) is one of said hydrolyzed polyacrylamide metal salt or polyacrylic acid, component (c) is one of hydrochloric acid, sulfuric acid, sulfamic acid, citric acid, acetic acid, and polyacrylic acid, component (b) forms a precipitate with component (a) when mixed with one another at a pH in or greater than 3 to 5, and component (c) is present in an amount to reduce the pH of the composition to less than 3 to 5.

5. A method according to claim 4 wherein polyacrylic acid is employed for both components (b) and (c).

6. A method according to claim 2 wherein component (a) is present in amounts of from about 4 to about 20 weight percent, component (b) is present in amounts of from about 0.4 to about 2 weight percent, and component (c) is present in amounts of from about 2 to about 5 weight percent, all weight percentages being based on the total weight of the composition.

7. A method according to claim 1 wherein component (a) is present in an amount of from about 1 to about 99 weight percent, component (b) is present in an amount of from about 0.01 to about 60 weight percent, and component (c) is present in an amount of from about 0.1 to about 25 weight percent, all weight percents being based on the total weight of said composition.

8. A method according to claim 1 wherein component (c) is provided by the polyacrylic acid of component (a).

9. A method according to claim 1 wherein there is also present an effective supporting amount of a substantially inert liquid carrier material.

10. A method according to claim 9 wherein said carrier material contains at least one of fresh water; salt water; brine; sea water; glycol having from two to 10, inclusive, carbon atoms per molecule; alcohol having from one to 10, inclusive, carbon atoms per molecule; acetone; oil; and oil fractions.

11. A method according to claim 1 wherein said composition is employed in amounts of at least about 0.01 gallons.

12. A method according to claim 1 wherein said components (a), (b), and (c) are introduced into the well and formation so that components (a) and (b) are not contacted with one another at a pH sufficient to cause the formation of said precipitate before components (a) and (b) are dispersed in said formation.

13. A method according to claim 1 wherein said pH is raised by allowing natural conditions in said formation to raise said pH.

14. A method according to claim 1 wherein said pH is raised by a combination of adding material to said well and formation which is basic relative to the pH of said composition and by allowing natural conditions in said formation to raise said pH.

15. A method according to claim 1 wherein component (a) contains at least one of amines, amides, mercaptans, heterocyclic nitrogen compounds, ureas, and thioureas.

16. A method according to claim 1 wherein component (c) is at least one acid of the group hydrochloric, sulfuric, nitric, sulfamic, citric, acetic, chloroacetic, peracetic, and polyacrylic.

17. A method according to claim 1 wherein component (a) is at least one of imidazolines and amides each having from six to 50 carbon atoms per molecule.

* * * * *